INVENTORS
KENNETH E. CURRAN
PETER VER PLANCK
JARL A. CARLSON

Aug. 3, 1965   K. E. CURRAN ETAL   3,198,494
MOBILE BATCHING APPARATUS
Filed March 27, 1964   6 Sheets-Sheet 3

INVENTOR.
Kenneth E. Curran
Peter Ver Planck
Jarl A. Carlson
BY Theodore C. Browne

INVENTORS
KENNETH E. CURRAN
PETER VER PLANCK
JARL A. CARLSON

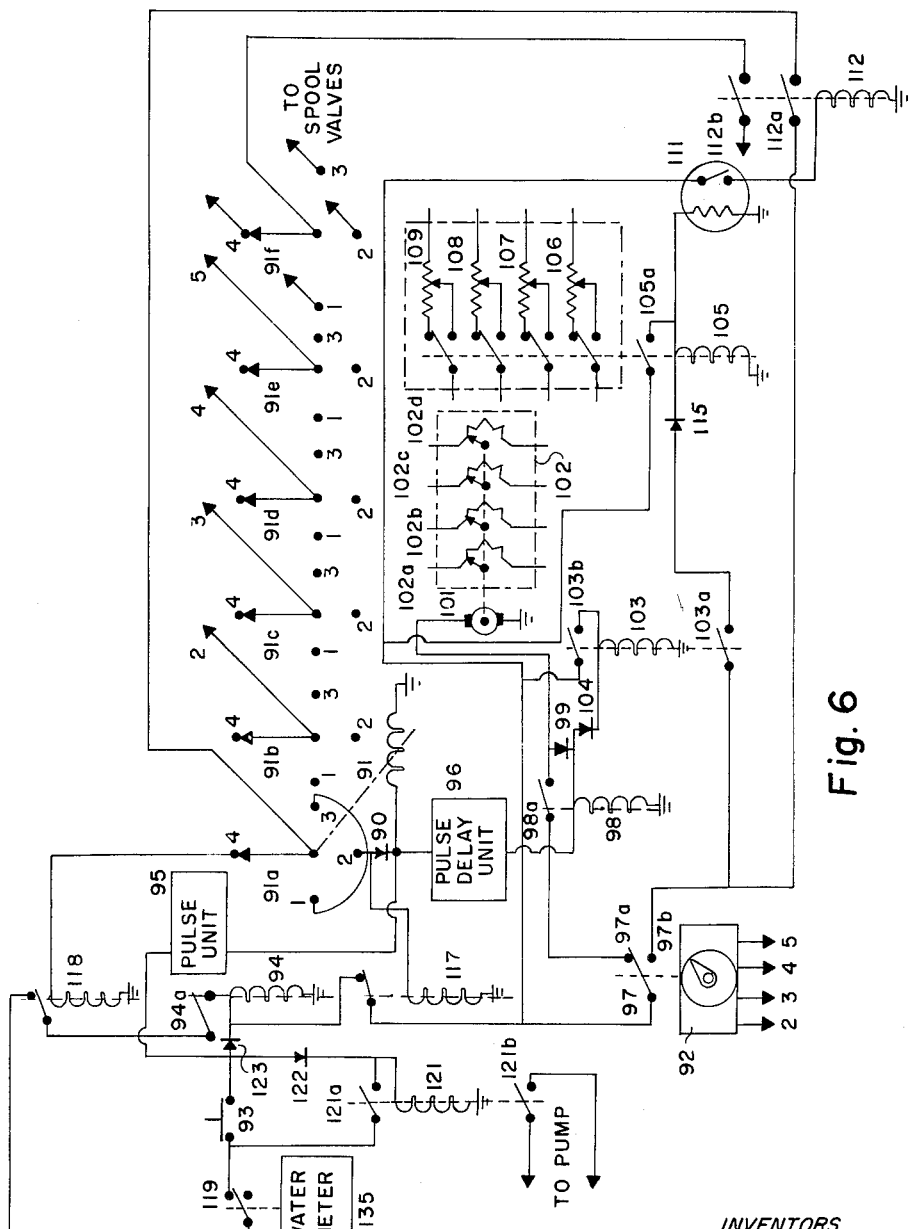

United States Patent Office 3,198,494
Patented Aug. 3, 1965

3,198,494
MOBILE BATCHING APPARATUS
Kenneth E. Curran, Littleton, N.H., Peter Ver Planck, La Jolla, Calif., and Jarl A. Carlson, Bedford, N.H.; said Carlson and Ver Planck assignors to said Curran
Filed Mar. 27, 1964, Ser. No. 355,289
8 Claims. (Cl. 259—154)

This invention relates to batching apparatus and particularly to a comparatively light-weight, mobile batching plant for structural concrete.

It has long been known that unless the specified mutual proportions of Portland cement, sand, fine aggregate, coarse aggregate, and water are carefully maintained from batch to batch throughout the delivery, a structure lacking in design strength, durability and appearance will result.

In metropolitan communities, where business volume warrants the investment, the permanent type batching plant with its transit-mixers assures a high order of control and uniformity, but in areas where the distance from a fixed plant makes the haulage cost in transit mixers excessive, or whenever the haulage time exceeds the time limit dictated by the chemical reaction of cement when brought in contact with aggregates, on-site batching becomes necessary.

If the time required for a transit mixer to reach its destination after receiving its load of sand, aggregates, and cement exceeds 90 minutes, many states will not accept such concrete. It is presumed that the absorbed surface film of moisture on the sand and aggregate will have caused deleterious degrees of hydration of the cement to occur within this time, and that the resulting concrete will be unsuitable. Consequently, in addition to excessive hauling costs, hauling times which exceed 90 minutes prevent the use of transit mixers and require on-site batching of the components of cement.

In highway work especially, fast, dependable, and accurate batching is mandatory to satisfy construction specifications, but the temporary or portable batching equipment now available to the contractor usually is so costly to move to and set up on the site that its use for small or medium-size structures such as a small bridge is not economically justifiable. As a result, batching methods which have a high probability of error are used. Miscounts in the volume of ingredients often occur merely because of confusions at the site, for trucks, men, and loaders are working rapidly in a restricted space. At other times, inattention on the part of the batching operator is responsible for gross errors, the results of which are so serious or so expensive to correct that there is real need to make on-site batching of small quantities of concrete not only inexpensive but automatic and free from possible error.

The objects of the present invention are: to produce a concrete batching machine which is highly mobile; to produce a machine which does not exceed the legal weight, width, or vertical clearance limits; to produce a machine of such maximum height that the aggregate bins can be loaded by an ordinary front-end loader; to produce a machine which can be moved from place to place and put in operation without the requirement for testing and resealing of the weigh apparatus by the sealer of weights and measures; to produce a machine which requires no on-site assembly, but is ready for operation as soon as the jacks can be lowered to the mud sills; and especially to produce a machine which eliminates miscounts and other errors by its complete, automatic start-to-finish performance of all batching operations in proper sequence.

In its simplest embodiment, the present machine weighs out successively accurately weighed quantities of each of the concrete components, e.g., fine aggregate, coarse aggregate, sand, cement, and if desired, water. It signals when the correct amount has been delivered to a conveyor belt which receives the aggregates and moves the measured components to an elevated delivery head, whence they fall into the loading chute of a portable mixer.

The preferred embodiment is a machine which is completely self-contained and automatic in operation. This will be described as the preferred example. Once the start button of this machine is pushed, the machine proceeds to weigh out in succession pre-determined weights of each component, carry them to an elevated delivery head above the chute of a portable mixer, and wet the dry ingredients falling into the mixer with a pre-determined weight of water. When the complete batch has been delivered to the mixer, the machine locks itself out of operation. A print-out mechanism may be added to the apparatus which will make a printed record of the weight of each component added to the batch.

In the drawings:

FIG. 6 is a diagram of the electrical circuitry which secures the automatic sequential operation of the machine.

Frame and bins

Figure 1A:
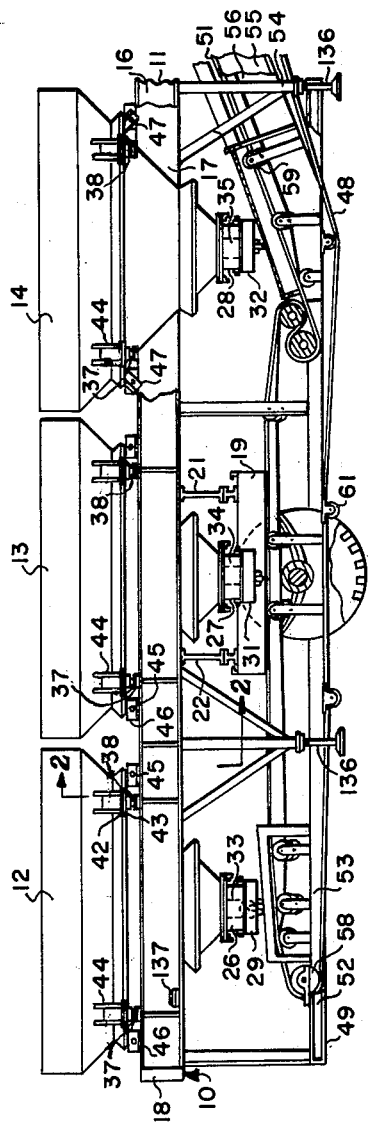
FIG. 1a is a right-side elevation of the rear (aggregate bin portion) of the machine.
Figure 1B:
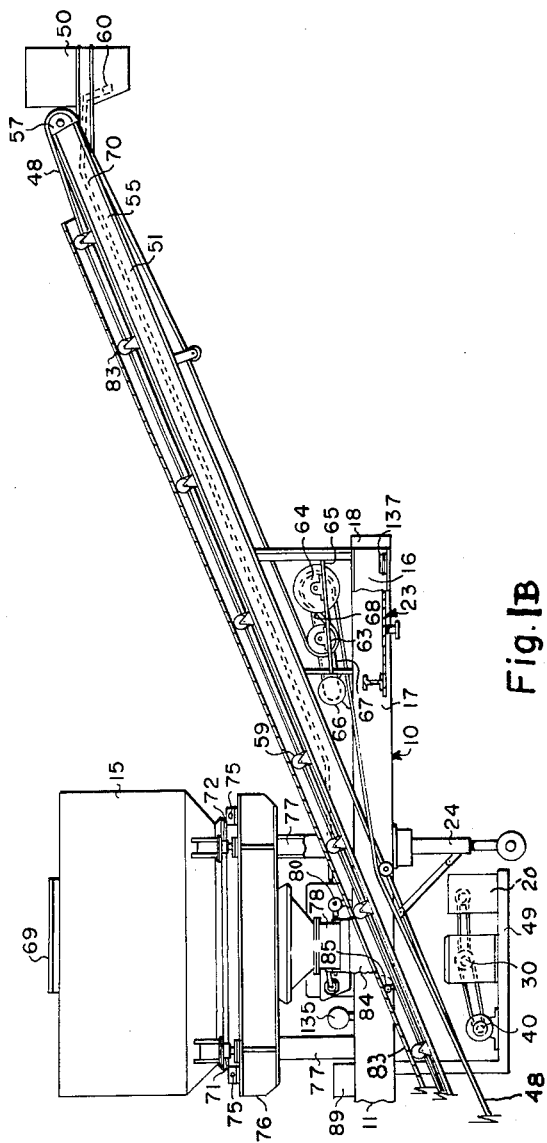
FIG. 1b is a right-side elevation of the head-end of the machine.

Referring to FIG. 1, the machine 10 consists of a trailer bed frame 11, on which four bins or material hoppers 12, 13, 14 and 15, are mounted. The frame 11 consists of two parallel longitudinal beams, 16 and 17, and cross members, 18—18, welded to and extending between the beams. In contrast to the usual trailer frame, the width of frame 11 equals the maximum width of the vehicle. Not only does the width permit the aggregate bins to be so mounted that a substantial portion of their hopper bottoms projects between and below the beams, but it allows the points of support to be placed near to the maximum dimensions and close to the corners of each bin. The position of support has proved significant. It permits the aggregate bins to be set low enough to be loaded with the usual front-end loader (the upper margin of the bins is 8 feet above ground level), but the wide spaced 4-cell support and the short vertical wall of the bin above the support greatly reduce the tilt and side thrust forces which dumping material into the bin otherwise would cause. Sustained weighing accuracy of the apparatus results.

Frame 11 is supported by a dual wheel trailer undercarriage, 19, which is fastened to the transverse beams 21 and 22. The forward end of the machine, when in the position of road travel, is supported by a tractor unit which engages a fifth-wheel assembly 23, welded to and between the forward ends of the beams 16 and 17. (The tractor unit is not shown.) Landing gear 24, fastened to the frame at the rear of the fifth-wheel assembly, supports the forward end of the machine when the tractor is not connected.

In the particular machine herein described, bins 12, 13 and 14 have open tops and are 8 feet square. The vertical wall portion is approximately a foot high. The bottom walls converge inwardly at an angle of approximately 45°.

The lower end of each of the bins 12, 13 and 14 opens into a centrally located unloading box. Unloading boxes 26, 27 and 28 are identical and are arranged to be opened and closed by clamshell material gates 29, 31 and 32, which are opened and closed by the double-acting pneumatic cylinders 33, 34 and 35, the piston rods of which are connected to the operating linkage 36 (see FIG. 2) of the gates. Each cylinder is powered by air supplied from air compressor 20, and is controlled by an electromagnetically operated spool valve 114, biased in the "close-gate" position. If electric operation is desired, solenoids can be substituted for the air cylinders, but air operation is preferred.

Each bin, 12, 13 and 14, rests upon a weight-responsive transducer bridge system comprising four load cells 37, 38, 39 and 41, interposed between two hardened and ground plates 42 and 43. Lower plate 42 overlies the top surface of the frame. Upper plate 43 is fastened to a short leg 44, which is welded to the inclined wall of the bin adjacent each of the corners.

In order for the load cells to operate properly, it is necessary for the bins to be capable of slight vertical movement in the order of 0.012 inch, no load to full load. It is also necessary that this vertical movement be substantially unrestrained.

The bins are maintained in position by stay rods, 45—45, which extend between the angle brackets, 46—46, welded to the main frame members, and angle brackets, 47—47, which are attached to the inclined walls of each bin adjacent the center line. Rods 45 are pulled up to a heavy tension by nuts threaded on their ends, and thus maintain the clearance and alignment.

The load cells 37–41 may be any of the well-known load responsive types which deliver an electrical output in response to variations in imposed load. Preferably the cells should incorporate a load relieving mechanism to remove impact load from the strain gauge element of the cells which may occur when the machine is being transported. The cells may, for example, incorporate a lockout mechanism as shown in the Ruge Patent 2,472,047, or have other equivalent lock-out means.

Material conveyor

Material which is released from the bins when the gates open, falls onto an endless conveyor belt 48. Its longitudinal axis and the axis of the frame lie in the same vertical plane. Belt 48 carries the sand, aggregates, and cement forward from the bins, and elevates the components to a position where they may be discharged into the chute of a portable concrete mixer. Belt 48 which extends for practically the entire length of the machine, is supported beneath the machine by a horizontal subframe 49. Its up-running portion is carried by a fixed forward and upward extension 51, of the main frame 11, which extends upward at an angle of about 20° and to a distance of about 14 feet forward of the ends of beams, 16 and 17.

Subframe 49, which comprises two longitudinal beams, 52 and 53, joined by appropriate cross members, is suspended from the main beams, 16 and 17, by the struts 54—54. Extension 51 comprises two appropriately braced beams 55 and 56 which are welded to the respective subframe beams 52 and 53 as well as to the frame cross members. The conveyor belt 48 is looped between the belt pulley 57, journaled at the head end of extension 51, and belt pulley 58 which is journaled at the rear of the subframe 49.

Troughing roll assemblies 59, placed at numerous locations as shown and extending between the respective beams 52 and 53, and beams 55 and 56, support and dish the upper flight of belt 48. Transverse rollers 61, intermediately positioned as shown, support or direct the return flight.

In its return flight, belt 48 wraps about reversing roll 63 and then passes about drive roll 64. Rolls 63 and 64 are journaled on frame substructure 65. The belt is driven by electric motor 66 through a fluid coupling 67 and the V-belt drive 68.

Cement supply

Bin 15, which is actually a cement silo, has the same configuration but a considerably larger capacity (60 barrels) than the remaining bins. It is decked and provided with a tight-fitting manhole cover 69. Bin 15 is mounted on an upward extension 76 of frame 11 and is suspended in the same manner as previously has been described, namely, on load cells 71, 72, 73 and 74, and centering rods 75—75. Extension 76 comprises a square, I-beam structure, carried on four legs 77—77 which are welded to the beams 16 and 17, respectively. The bottom wall of bin 15 is pyramidal and terminates in an unloading box 78. Box 78 houses a "cement valve" which, essentially, is a sector plate arranged to rotate through 90° in a cylindrical chamber and so opens or closes the passage. As in the case of bins 12, 13 and 14, the cement valve is opened and closed by an air cylinder 80, which rotates the valve axle 81, through appropriate mechanism, variously either bell cranks or a rack and pinion. Each of the sloping pyramidal inside walls of the bin is provided with an inflatable rubber lining 82, which may be inflated and deflated four or five times a minute during the operation of the machine to prevent any arching of the cement above the cement valve. The air-operated pulse valve and pressure regulator which drops the air-tank pressure to the low (5 lb.) pressure required are not shown but are located directly beneath the rear sloping wall of bin 15. The low frequency balance thrust produced by these pulsating walls contributes to the sustained weighing accuracy of the apparatus. Rotary agitators, bin wall vibrators and other devices for maintaining the flow of cement have been found to produce unbalanced force transients leading to spurious weight readings.

The entire upward flight of conveyor belt 48 is covered with a sheet metal weather deck, or roof 83. Cement, leaving unloading box 78, falls onto the belt through a canvas boot 84, which surrounds an aperture cut through the deck. When the cement valve 79 is discharging cement, a belt wiper 85, which normally lies parallel to and just below deck 83, turns into edge contact with the belt 48 and prevents any down-hill flow of cement. Wiper 85 operates in synchronism with the operation of the cement valve 79 through a linkage 86 to the piston 87 of cement bin air cylinder 80.

Water delivery

Weighed quantities of water are forced to the head end of the machine by a motor-driven water pump 89, which forces water from a tank (often a separate tank truck is employed to bring water to the site) through the meter 135 and then through the conduit 70, which runs along the web of beam 17, and terminates in a downwardly-directed spray head 60, located in the delivery box 50. The water meter is of the "pounds cutoff" type and includes an N.C. switch 119 (FIG. 6), which opens a relay 121 (FIG. 6), controlling the pump motor circuit after the set number of pounds of water has been delivered. Accordingly, the allotted amount of water is distributed over the aggregate and the cement during the period of their movement into the mixing drum.

Energy sources

When electric power is available at the various sites, a cable connection is provided. Otherwise an engine 30, which drives an electric generator 40, and an air compressor 20, all mounted on the subframe 49, is the source of all energy required by the machine. Generator 40 supplies electric power to all motors and the weight-measuring circuitry. Air compressor 20 supplies compressed air for the operation of the gate valves, the cement valve air cylinder, and the inflatable walls in cement bin 15.

Weighing means

The determination of weight delivered by our apparatus is secured by the automatic "null-balance method" in which the voltage unbalance of the transducer bridge is balanced by an indicating instrument bridge having its slide wire contact driven by a servo motor. The amplified difference between the two voltages is used to drive the servo motor.

Weighing systems incorporating this principle are well known. In the usual so-called "semi-automatic systems," the tare is set by the operator before each weigh-out. This is accomplished by adjusting a potentiometer which feeds an opposing voltage of sufficient magnitude into the transducer output to cause the balance indicator to return to zero. The weight of material to be delivered is controlled by a microswitch which can be moved circumferentially about the dial. The switch is set opposite to the desired weight reading on the dial. Since the instrument pointer moves across the scale as the container unloads, it trips the microswitch when the weight of material discharged equals the pre-set weight. Tripping the switch shuts off the flow of material. The machine described above can be equipped with such a conventional weigh-out system. Such a machine with manual tare adjustment, manual selection of the bins, and manually set weigh-out is one embodiment of the invention.

In this case, the operator must first throw a mode switch to connect the self-balancing potentiometer to the load cells of one of the bins. Since the bin may have received a fresh charge of aggregate, or at any event, have discharged aggregate in its previous cycle of operation, the operator must adjust the zero potentiometer to bring the indicator pointer back to zero. He then must set the "pounds-delivered" by moving a microswitch to the correct position on the dial, and then he must press the proper start button.

Although this system of batching vastly improves accuracy of measurement as contrasted with, i.e., volumetric measurement, nevertheless in cement batching, when four separate ingredients each with different delivered amounts must be separately tared and the delivered weight must be set, all in proper order, strict attention on the part of the operator is necessary.

Figure 4:
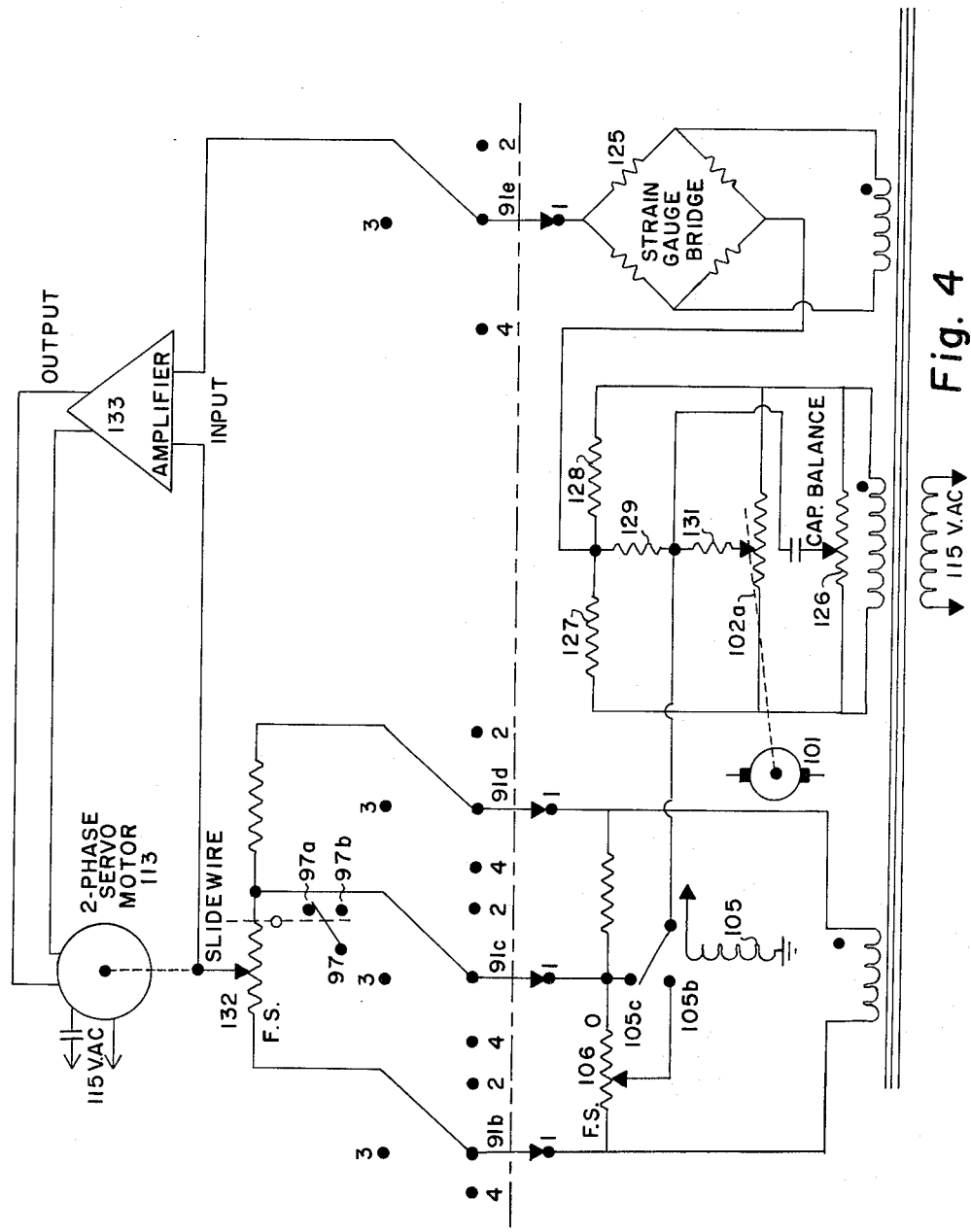
FIG. 4 is a diagram of the load cell circuit as modified by the insertion of automatic circuit means shown in FIG. 6.
Figure 5:
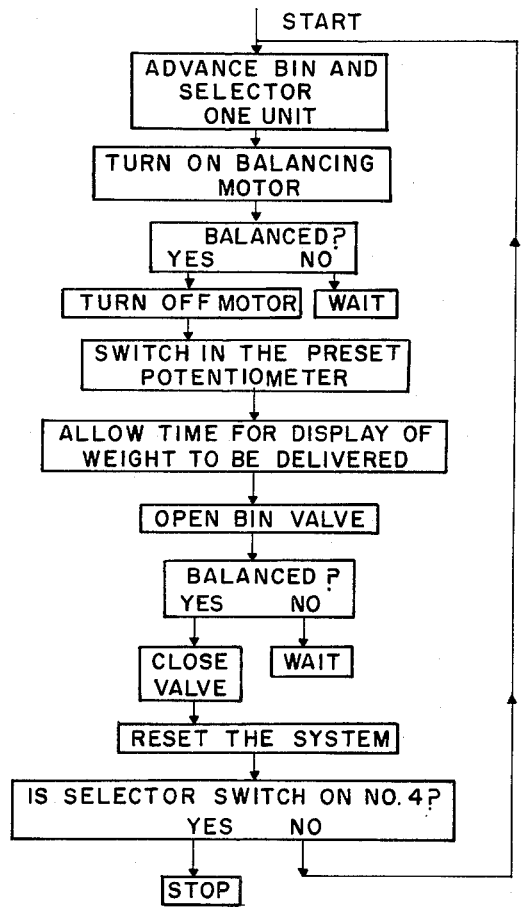
FIG. 5 is a block diagram showing the sequence of operations performed by the automatic circuitry.

In the present machine, which is the preferred embodiment, this null-balance system is modified to perform the automatic, sequential weighing and delivering of all ingredients of a concrete batch by adding a control system, and associating the new system with the load cell circuitry. The logic diagram showing its operational functions is shown in FIG. 5. FIGURES 4 and 6 show our improved circuitry which permits the complete automatic weigh-out, assembly and delivery of all ingredients of a batch in proper sequence. When the mixer is in place beneath the delivery head of the machine, the operator pushes a start button and all operations thereafter until batching of that batch is complete, proceed automatically.

In FIG. 6, which illustrates a null-balance strain-guage weigh-out circuit as modified to secure automatic, sequential operation, two conventions have been adopted:

(1) All four load cells associated with one bin are represented as a single strain-guage bridge.

(2) Duplicated wiring systems (for bins 13, 14 and 15) are not shown.

When the self-balancing potentiometer, 92, is a pointer-indicator type such as, for example, Baldwin, Lima, Hamilton type 110 which has a built-in "weigh-out" control point, the position of this control point is locked at zero on its scale. (Control is represented by switch 97 in the diagram.)

Strain-guage 125 produces a voltage which is proportional to the total load of one material bin. The strain-guage bridge output voltage is placed in series with an automatically controlled voltage source, potentiometer, 102a, capacity balance potentiometer 126, and resistors, 127, 128, 129 and 131.

When the switch 97 is in the position 97a, a voltage from slide wire 132 of the self-balancing potentiometer 92, is led to the input of amplifier 133. The wiper of slide wire 132 is moved by a two-phase servo motor 113. The phase of the output voltage of amplifier 133 controls the direction of servo-motor rotation. As the circuit is set up, the rotation of the slide wire wiper is in the direction to reduce the voltage applied to the amplifier. The wiper continues to move until the balanced condition is found.

The first step in the automatic sequence is the setting of the slide wire voltage to zero by the operation of motor-driven potentiometer 102. Reference to FIG. 6 will show that the motor 101 will stop in the zero balance position by the opening of contact 97a. When switch 105 closes to make contact on 105b, it connects one of four adjustable, calibrated precision resistors having their dials graduated in pounds and which have been pre-set before the batching started to the weight demanded by the concrete specification, i.e., resistor 106.

The voltage from the wiper to the zero end of resistance 106 (which represents the desired weight of material to be released from the bin) is placed in series with the slide-wire circuit. Since the voltage output of strain-guage bridge 125, and the balancing network 102a have been set to zero, the voltage introduced into the circuit is compensated by movement of the slide-wire 132. The pointer of the potentiometer 92, now advances to a weight reading which should be the same as the preset weight set on resistor 106. The movement of the pointer allows an inspector to check the accuracy of the pre-set weight setting of resistor 106, at this moment. As the material leaves the bin, the output of the strain-guage bridge 125 is reduced. The slide-wire follows the reduction in voltage. When the slider reaches zero, indicating that the weight has been delivered, switch 97 opens contact 97a. The opening of switch 97 causes the material gate to close.

Considering the control system alone, FIG. 6, electrical connections to each group of the four cells associated with each bin are brought into a multi-deck selector switch 91. Power for the operation of this circuit is preferably low voltage D.C.

In the automatic sequence, the groups of cells are switched in succession to the self-balancing potentiometer 92. In the initial condition of the circuit, all relays are unlatched; the selector switch is in position No. 4. The circuit will return to this condition automatically after all operations are completed. The order of operations is as follows:

(1) When the start button 93 is pushed, (a) Relay 94 latches, i.e. it is held down by power flowing through its own contacts 94a, and those of relay 118 independent of that start button.

(b) At the same moment, pulse unit 95 delivers a short pulse to selector switch 91, and to pulse delay unit 96. Rectifier 90 prevents this pulse from energizing relay 117.

(2) As the pulse dies in the coil of the selector switch 91, all of the wiper arms move from position 4 to position 1.

(a) The four wires from the load cells of bin 12 are now connected to the balance detector unit 92 by the movement of the wiper arms on decks 91a, b, c, and d of the selector switch. (FIG. 4 shows these connections in detail for a typical bin.)

(b) The weight of material in bin (say # 12) causes the slider of potentiometer 92 to move to some point different from zero pounds. Therefore, the leaf of microswitch 97 of potentiometer unit 92 will "make" on contact 97a.

(3a) A pulse delay unit 96 allows time for potentiometer 92 to respond to the weight on bin 12 before balance relay 98 is pulsed.

(b) At the delayed pulse, relay 98 latches, since current now flows to the coil of 98 via the rectifier 99, and the closed contacts 97a and 98a.

(c) The latching of relay 98 energizes slow "instant-stop" motor 101, which now rotates four tandem continuous winding potentiometers 102a, b, c, and d. These are connected in the respective zero balance circuits of the four groups of load cells (see FIG. 4). The motion of the potentiometer arms is slow enough to allow for whatever motion of potentiometer 92 is necessary. (A typical instrument requires about 12 seconds for full scale excursion.)

(4) At the same time, motor relay 103 closes its contacts 103a and b. Rectifier 104 enables the motor to be turned off while motor relay 103 is still latched. The contacts 97a of microswitch 97 will open when potentiometer 92 indicates that the zeroing operation is complete.

(a) Balance relay 98 opens, since current through its coil has now been cut off.

(b) Motor 101 stops "instantly," leaving the potentiometer 102a in the precisely zeroed position.

(c) As the leaf on microswitch 97 moves to contact 97b, current flows from 97b over the closed contacts 103a of the motor relay 103 through rectifier 115, and energizes potentiometer relay 105.

(d) Relay 105 simultaneously connects four pre-set resistor units 106, 107, 108, and 109. Each one of these adjustable resistor units represents the pre-set weight of one of the ingredients which will be delivered. The operation of relay 105 switches pre-set resistor 106 (when bin 12 is connected) into the zero balance circuit (see FIG. 4).

(e) Balance detector 92 responds to the addition of the pre-set resistor, and its pointer reads out the weight to be delivered. Visual read-out at this time permits an inspector to make a visual check of the accuracy of the "weigh-out" setting and "weigh-out" performance.

(f) Since the contacts 105a of relay 105 close when the relay operates, current passes to the delay unit 111, and potentiometer relay 105 is latched.

(g) Delay unit 111 introduces a sufficient delay to allow time for potentiometer 92 to display the weight to be delivered. Some time after the relay 105 latches, e.g., 12 seconds, current passes to the "open valve" relay 112.

Figure 2:
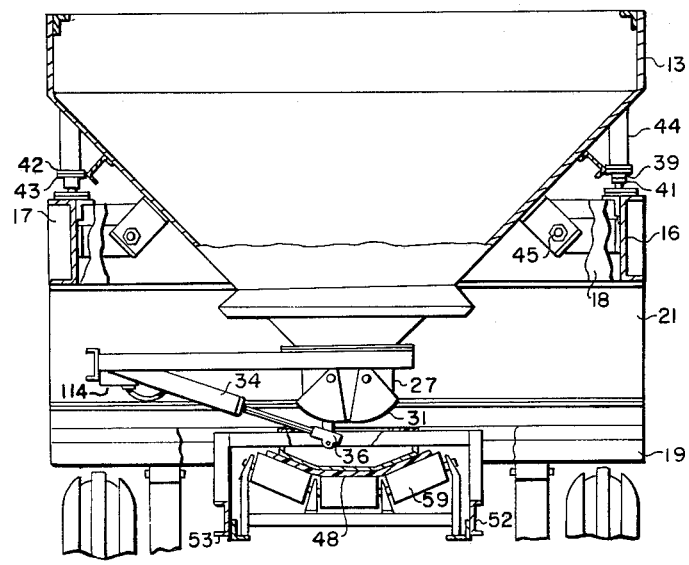
FIG. 2 is a sectional view on the line 2—2 of FIG. 1.
Figure 3:
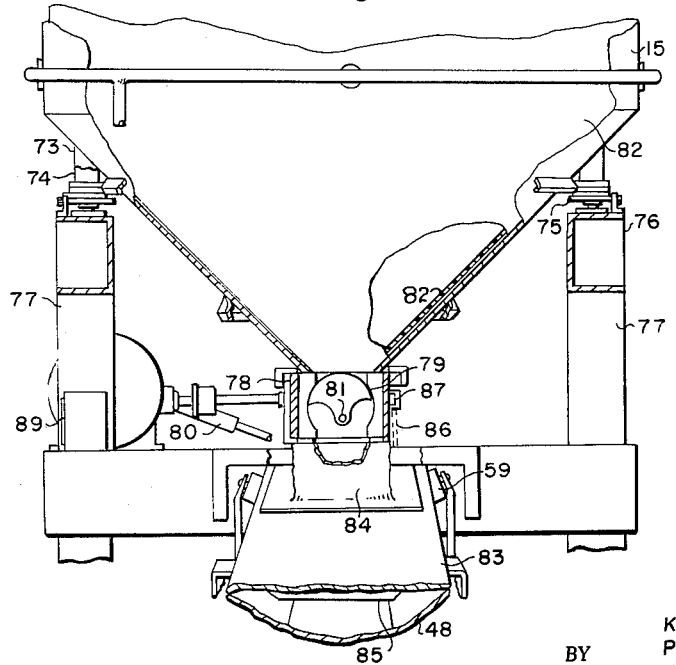
FIG. 3 is a detailed elevation of the lower portion of the cement bin. The break-away shows the means used to prevent bridging and arching of the cement.

(5a) The closing of contact, 112b, trips the electromagnetic spool valve, 114, which now is connected through deck, 91f, and air cylinder 35 opens the material gate of bin 12 (see FIG. 2).

(b) As the material flows out of the bin and on to the carrier belt, the pointer of potentiometer 92 moves down scale. When the preset weight of material has been delivered, the dial of potentiometer 92 reads zero, and microswitch 97 closes.

(c) The leaf of microswitch 97 makes contact with 97b, delivering current to the slow-release resetting relay 117, via the contacts 112a, and selector switch deck 91a.

(6) Arm 91a is still in the #1 position.

(a) Power is applied to the coil of selector switch, 91, and the pulse delay unit 96, via rectifier unit 90. Because the selector switch moves only when power is removed, no action occurs immediately.

(b) The slow operate-and-release relay 117 now opens, and the previously latched relays 103, 105, and 112, as well as delay relay, 111, open. The sluggishness of relay 117 prevents any "buzzer" action from occurring.

(1) Opening of 112b removes current from spool valve 114, and air cylinder 35 closes the material gate of bin 12.

(2) Power is removed from the coil of selector switch 91 by the opening of relay 117. The wiper arms of switch, 91, move to position #2.

(3) Relay 117 returns to its normally closed position.

(7) Since the selector has moved to position #2, the load cells of bin 13 are now connected into the balance potentiometer 92 circuit via the arms on decks, 91b–91e. During the delay provided by unit 96, the weight of bin 13 will cause the slider of self-balancing potentiometer 92 to move away from the zero position. As it does so, the leaf of microswitch 97 moves from contact 97b to 97a.

(8) When the delay provided by delay unit 96 is complete, balance relay 98 closes. From here on, the entire procedure recycles from step 3b through 7, until the material in all four bins has been discharged. As the cycle progresses from bin to bin, arms of selector switch 91 progressively move from position #1 to position #4, and prior to shutdown, switch 91 is in position #4.

Shut Down

When the signal from contacts 97b via 112a comes to close the valve on the last material bin, say #15, arm 91a, of selector switch 91, is in the position #4 and current is delivered to the slow operate-and-release relay 118.

(a) Relay 118 opens, power is cut off from the entire circuit, all relays are unlatched, and the system halts in its initial condition.

(b) Relay 118 recloses upon the removal of its excitation, but nothing further occurs since the main power relay 94 is now unlatched, and its contacts 94a are open.

Water Control

Water is pumped to the delivery head 60 of the machine by a motor-driven water pump 89. The weight of water to be delivered is set on a "repeat operation" water meter 135, which carries a built-in switch 119, which opens when the pre-set number of pounds of water has passed through the meter. Switch 119 is wired into the circuit in advance of the start button 93. Current to energize the pump relay 121 therefore must pass across the contacts of switch 119, across the closed start button 93, and enter the coil of relay 121, through rectifier 122. Relay 121 latches via contacts 121a. Contacts 121b energize the motor of pump 89. The pump 89, therefore, starts when the start button 93 is pressed, and stops when water meter switch 119 opens. The batching operation, however, continues independently of the operation of water meter switch 119. Conversely, the batcher circuit can stop, leaving the pump on. The rectifiers 122 and 123 insure that relay 94 will not influence relay 121 or vice-versa.

Operation

When the machine is first wheeled into position, mud sills are laid beneath the jacks 136—136, which are positioned directly beneath the struts 54—54. The jacks may be either mechanical or hydraulic, and are lowered to bear on the mud sills. The machine is leveled both transversely and lengthwise, its entire weight resting on the four jacks. Levels 137—137 fastened to the frame facilitate this adjustment.

The tractor unit is disconnected from the fifth wheel 23 and a portable concrete mixer is wheeled into position beneath the delivery box 50 of the batcher. Bins 12, 13 and 14, are then filled by a front-end loader from nearby stock piles of sand and aggregate. Cement is loaded into bin 15 by air transfer from a bulk cement carrier. Water pump 89 is connected by a hose to a separate water tank (usually a tanker truck) and the machine is ready for operation. These preliminaries ordinarily can be accomplished in about 15 minutes.

Assume that the specifications call for "Class A" concrete, at six bags of cement per cubic yard, and the mixer load is to be six cubic yards, the operator sets the calibrated dials of potentiometers, 106–109, as follows: the "sand" dial is set to 6600 lbs., the "cement" dial is set to 3384 lbs., the "fine aggregate" dial is set to 6000 lbs., the "coarse aggregate" dial is set to 7000 lbs., and the water meter is set to 1400 lbs. The operator then starts the engine, closes the belt motor switch (the conveyor belt 48, the air compressor 20, and the inflatable pulsating walls 82 run continuously during the operation of the machine). The switches controlling the excitation current for the load cells and the D.C. control circuit are closed. (All power circuits are conventionally wired and are not shown.) He opens the air valve supplying air to the pulsing walls 82 in the cement bin 15. The operator then pushes the start button 93.

One after another, the various ingredients fall on to the belt and are lifted into the concrete mixer. So long as the same specification for concrete is adhered to, no resetting is required. The operator has but two duties: he must push the start button when the next mixer is wheeled into place, and he must see that no bin is loaded or emptied completely while that bin is discharging material. Lamps or a semaphore attached to each bin can be added to warn the operators of the front-end loaders not to dump when the signal shows. Since the control of the pounds delivered is pre-set and the machine automatically completes a batching cycle once it has been initiated by the operator, there is no chance for the operator to make errors in setting scale beams, counting loads, throwing beam latches, or performing many of the numerous tasks that are necessary when beam scales and weight pans form part of the apparatus.

An additional outstanding advantage is the fact that accuracy of the weigh-out mechanism is not affected by moving the machine. It can be placed in operation immediately and does not require tests by the sealer of weights and measures before the operations begin. Tests on the apparatus performed by a State bureau have shown that the weighing accuracy of each cell circuit, when tested with loads of official weights, lies within ½ of 1%. The weighing error of material delivered to the belt also was found to average approximately ½ of 1% of the set weight. Because of sustained accuracy, the operation of the device after one initial sealing is permitted. Test and inspection at each job location is not required.

Distinct features of the design which contribute to the utility of the machine are: the stability of the vehicle, not only in road transport but in use (this, in part, is due to the wide frame which permits a substantial portion of each aggregate bin to be placed well below the frame); the low profile of the aggregate bins and uncluttered sides, which allows aggregates to be loaded into the bins from either side of the apparatus; the absence of outriggers so that nothing interferes with the easy approach of a front-end loader; no parts of the equipment need to be assembled at the site, as is the case when collapsible or folding booms are used; the elimination of the need of skip buckets or detachable or hinged elevator extensions; and the complete elimination of the weight and space requirement of weigh pans.

We claim:

1. Mobile batching apparatus comprising a bed frame, a wheeled undercarriage and means detachbly to attach a truck-tractor unit for transporting said apparatus, the said bed frame having longitudinal side members located substantially along the lateral clearance lines of the vehicle, and transverse and intermediate members, strut support members having ground-engaging means for supporting the apparatus when in operating position, a fixed frame extension directed angularly upwards to a delivery point located in advance of said bed frame, conveyor means, a sub-frame beneath said bed frame supporting said conveyor means extending substantially from the rear of the apparatus to the said delivery point, power means to move the conveyor continuously, a plurality of rectangular aggregate bins, each of said bins having a short vertical upper wall portion and a lower portion having inwardly inclined walls, the said lower portion lying between the frame members and projecting downwardly to terminal bottom openings in each bin adjacent the conveyor, power-operated gate means to control said openings, a cement bin and means for its support above the bed frame, means controllably to permit the discharge of cement from said bin to said conveyor, transducer means adjacent each corner of each bin comprising an electrical load cell supported by said frame and positioned between the frame and support means on said bins whereby the weight of each bin is imposed on the group of four load cells, and means operatively associated with the load cells to cause the discharge of a predetermined weight of material from said aggregate bins and said cement bin on to said conveyor and thereafter cause the closing of the gates and the controllable discharge means when the said weight has been delivered, whereby measured amounts of the separate components of a concrete batch may be delivered to a concrete mixer.

2. Mobile batching apparatus having in combination a wheeled trailer bed frame, aggregate bins and a cement bin supported on said frame, each of said bins having a bottom opening, a conveyor running lengthwise of the frame and beneath said openings and to a discharge point located above and forward of said bed frame, power operated gate means to control the discharge of materials through said openings and on to said belt, power means to operate the conveyor, electrical load measuring means including a plurality of weight responsive load cells associated with each bin, means to pre-set the weight of material to be delivered from each bin, and a control circuit operatively associated with said measuring means and said power operated gate means, the said control circuit becoming operative upon a single initial impulse to cause the discharge of the pre-set weight of material from the first of said bins and thereafter progressively cause the discharge of a pre-set weight of material from each of the remaining bins, discharge of the pre-set weight of material from the last of said bins causing the lock-out of all of said material discharge means whereby all components of a concrete batch automatically are weighed out and delivered to a concrete mixer placed beneath said discharge point.

3. Mobile batching apparatus comprising a bed frame, means including a wheeled undercarriage for transporting said apparatus, a plurality of material bins mounted on the said bed frame and extending downwardly between the frame members, a bottom discharge opening in each bin, material gates arranged to control the passage of material through each bottom opening, conveyor means extending longitudinally from adjacent the rear of the main frame to a delivery point located forward and angularly upward from the said bed frame and passing beneath each opening, means including a sub-frame to support said conveyor means, means to power the conveyor, electrically controlled fluid power means to open and to close the gates, weight responsive transducer means including a group of load cells interposed between each bin and the said frame, said transducer means being capable of delivering an output voltage proportional to the total load on the respective bin, and means to control the weight and the delivery to said conveyor of increments of material in said bins in automatic sequence following a single initial impulse including (a) a control and load-measuring electric circuit
(b) manually controlled means to initiate the operation of said circuit
(c) power actuated multi-position switching means connected to the outputs of all of the groups of load cells and operatively connecting one group of cells into said circuit in each switching position
(d) a self-balancing potentiometer in said circuit
(e) a motor-driven means energized by an unbalanced condition evidenced by said potentiometer for introducing an opposing voltage into said load measuring circuit whereby the sum of the output voltage of the said group of cells and the said opposing voltage may be reduced to zero
(f) switching means operative after the said zero is reached arranged to introduce a weigh-out voltage into said circuit proportional to the desired weight of material to be delivered
(g) relay means effective after said weigh-out voltage is introduced to open the gate of the respective bin (h) discharge of the pre-determined weight of material from said bin on to the conveyor being effective to cause said potentiometer to return to zero balance (i) zero balance of said potentiometer then becoming effective to open the said relay means and thereby close the material gate and connect the said control and load measuring circuit to the load cells of the succeeding bin, the said circuit thereafter repeating the above series of operations for each of the remaining bins.

4. The apparatus as claimed in claim 3 wherein the self-balancing potentiometer is provided with means for visual read-out and wherein subsequent to the introduction of the weigh-out voltage, opening of the bin gate is delayed sufficiently to permit read-out of the weight of material which will be discharged, and the gate thereafter is opened.

5. Apparatus as claimed in claim 2 wherein means, made operative by the said initial impulse, are provided to supply a pre-set weight of water at the said discharge point.

6. Apparatus as claimed in claim 1, wherein the lower interior walls of the cement bin are provided with a flexible and inflatable lining and wherein means are provided to inflate and deflate the lining at a low pulsing rate, the said rate being below that which is capable of disturbing the accuracy of weight determination of the said load cells.

7. Apparatus as claimed in claim 1 wherein a prime mover, an electric generator and a fluid power source are mounted on the sub-frame, and wherein the said generator and fluid power source are operatively connected to the said prime mover to provide power for the apparatus.

8. Mobile batching apparatus having in combination a trailer bed frame having spaced frame members, an undercarriage having wheels, means to attach said apparatus to a tractor unit, a plurality of aggregate bins supported above the frame and having inclined lower walls extending between and beneath said frame members, a cement bin, bottom openings in each bin, a conveyor extending from end to end of said apparatus having a fixed elevator portion extending forwardly of the frame positioned to receive material released through said bottom openings, power means to control the flow of material through said openings, electrical weighing means associated with each bin, associated with said powered control means, means associated with said weighing means to pre-determine the weight of material to be delivered from each bin to said conveyor, the said weighing means causing said powered control means to stop the flow of material from said bins when the pre-determined weight of material has passed the opening, and power means to move the conveyor.

References Cited by the Examiner

UNITED STATES PATENTS

| | | | |
|---|---|---|---|
| 2,867,336 | 1/59 | Soldini et al. | 259—154 |
| 2,873,036 | 2/59 | Noble | 259—154 |

WALTER A. SCHEEL, *Primary Examiner.*

CHARLES A. WILLMUTH, *Examiner.*